J. B. STUART.
Fifth Wheel.
No. 64,380
Patented Apr 30, 1867
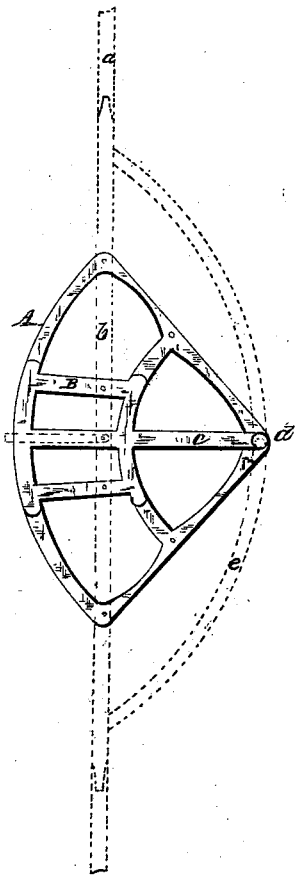
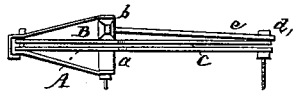
Witnesses:
Inventor:

United States Patent Office.

JAMES B. STUART, OF BUNKER HILL, ILLINOIS.

Letters Patent No. 64,380, dated April 30, 1867.

---

IMPROVEMENT IN FIFTH-WHEELS FOR WAGONS.

---

The Schedule referred to in these Letters Patent and making part of the same.

---

TO ALL WHOM IT MAY CONCERN:

Be it known that I, JAMES B. STUART, of Bunker Hill, in the county of Macoupin, and State of Illinois, have invented a new and improved Circle-Plate or Fifth-Wheel for Vehicles; and I do hereby declare that the following is a full, clear, and exact description thereof, which will enable others skilled in the art to make and use the same, reference being had to the accompanying drawings, forming part of this specification, in which—

Figure 1 is a plan or top view of my invention.

Figure 2, a side view of the same.

Similar letters of reference indicate like parts.

This invention relates to a new and improved circle-plate or fifth-wheel for vehicles, and has for its object the turning or cramping of the front axle in such a manner that the vehicle, to which the invention is applied, may be turned within a smaller compass than usual.

A represents a frame constructed in skeleton form and of quadrant shape, as shown clearly in fig. 1. The front axle $a$ is bolted to the front part of the frame A. B represents a plate on which the bolster $b$ is bolted. This plate B is provided with a bar, $c$, which extends from the rear of plate B, and the end of bar $c$, as well as the angle of frame A, is secured to the reach or perch of an ordinary vehicle by a bolt, $d$, and if a side-spring vehicle be used said bolt passes through a brace, $e$, attached to bolster $b$, as shown in red in both figures.

It will be seen from the above description that the front axle $a$ turns on the bolt $d$ as a centre, and as this bolt is at a considerable distance behind the axle $a$ it follows, as a matter of course, that when said axle is turned the front wheels will be cramped so as to make the vehicle describe a much shorter curve than when the axle, as hitherto, turns on a central king-bolt. By the arrangement of the frame A and plate B, as shown, the bolster and front part of the body of the vehicle have a good bearing, even when the axle $a$ is turned or cramped to the extent of its movement.

Having thus described my invention, what I claim as new, and desire to secure by Letters Patent, is—

A circle-plate or fifth-wheel for vehicles, composed of the frame A and plate B, connected by a bolt, $d$, and attached respectively to the front axle and bolster, substantially in the manner as and for the purpose herein set forth.

JAMES B. STUART.

Witnesses:
SAMUEL BOOTH,
W. F. JOHNSON.